US006976782B1

(12) United States Patent
Steger

(10) Patent No.: US 6,976,782 B1
(45) Date of Patent: Dec. 20, 2005

(54) METHODS AND APPARATUS FOR IN SITU SUBSTRATE TEMPERATURE MONITORING

(75) Inventor: Robert J. Steger, Los Altos, CA (US)

(73) Assignee: Lam Research Corporation, Fremont, CA (US)

( * ) Notice: Subject to any disclaimer, the term of this patent is extended or adjusted under 35 U.S.C. 154(b) by 0 days.

(21) Appl. No.: 10/720,839

(22) Filed: Nov. 24, 2003

(51) Int. Cl.$^7$ ............................ G01K 15/00; G01J 5/00
(52) U.S. Cl. .................... 374/1; 374/141; 374/121; 374/179; 356/45; 427/8; 438/9; 438/16; 156/345.27
(58) Field of Search ........................ 374/1, 2, 120, 374/126, 127, 141, 147, 121, 179; 427/8, 427/585, 535; 438/16, 9; 356/43, 45; 156/345.27

(56) References Cited

U.S. PATENT DOCUMENTS

| | | | |
|---|---|---|---|
| 4,854,727 A * | 8/1989 | Pecot et al. ..................... 374/1 |
| 4,919,542 A * | 4/1990 | Nulman et al. ............. 374/126 |
| 5,021,980 A * | 6/1991 | Poenisch et al. ............ 374/120 |
| 5,200,023 A | 4/1993 | Gifford et al. |
| 5,225,245 A * | 7/1993 | Ohta et al. .............. 427/248.1 |
| 5,229,303 A | 7/1993 | Donnelly, Jr. et al. |
| 5,270,266 A * | 12/1993 | Hirano et al. ................ 118/724 |
| 5,350,479 A * | 9/1994 | Collins et al. ......... 156/345.53 |
| 5,388,909 A | 2/1995 | Johnson et al. |
| 5,467,732 A | 11/1995 | Donnelly, Jr. et al. |
| 5,490,728 A | 2/1996 | Schietinger et al. |
| 5,549,756 A * | 8/1996 | Sorensen et al. ........... 118/715 |
| 5,568,978 A | 10/1996 | Johnson et al. |
| 5,660,472 A | 8/1997 | Peuse et al. |
| 5,676,205 A * | 10/1997 | White .................... 156/345.27 |
| 5,683,180 A | 11/1997 | De Lyon et al. |
| 5,746,513 A | 5/1998 | Renken |
| 5,755,511 A | 5/1998 | Peuse et al. |
| 5,769,540 A | 6/1998 | Schietinger et al. |
| 5,775,808 A | 7/1998 | Pan |
| 5,806,980 A * | 9/1998 | Berrian ........................ 374/179 |
| 5,823,681 A * | 10/1998 | Cabib et al. ................. 374/126 |
| 5,848,842 A | 12/1998 | Peuse et al. |
| 5,967,661 A | 10/1999 | Renken et al. |
| 5,996,415 A | 12/1999 | Stanke et al. |
| 6,062,729 A * | 5/2000 | Ni et al. ...................... 374/126 |
| 6,063,234 A * | 5/2000 | Chen et al. ............ 156/345.27 |
| 6,082,892 A | 7/2000 | Adel et al. |
| 6,106,148 A * | 8/2000 | Moslehi et al. ................. 374/1 |
| 6,112,595 A | 9/2000 | Stanke et al. |
| 6,116,779 A * | 9/2000 | Johnson et al. ............. 374/120 |

(Continued)

OTHER PUBLICATIONS

Muller, "Control of Reactive Ion Etching Process for InP and Related Materials by In Situ Ellipsometry in the Near Infra Red," 2$^{nd}$ Intl Cont, Lib. of Cong. #90-80596, IEE Cat No. 90CH2859-7, pp. 211-214 (Apr. 1990).*

(Continued)

*Primary Examiner*—Diego Gutierrez
*Assistant Examiner*—Stanley J. Pruchnic, Jr.
(74) *Attorney, Agent, or Firm*—IP Strategy Group, PC

(57) ABSTRACT

In a plasma processing system, a method of determining the temperature of a substrate is disclosed. The method includes positioning the substrate on a substrate support structure, wherein the substrate support structure includes a chuck. The method further includes creating a temperature calibration curve for the substrate, the temperature calibration curve being created by measuring at least a first substrate temperature with an electromagnetic measuring device, and measuring a first chuck temperature with a physical measuring device during a first isothermal state. The method also includes employing a measurement from the electromagnetic measurement device and the temperature calibration curve to determine a temperature of the substrate during plasma processing.

49 Claims, 4 Drawing Sheets

U.S. PATENT DOCUMENTS

| | | | |
|---|---|---|---|
| 6,174,080 B1 | 1/2001 | Jennings | |
| 6,179,466 B1 | 1/2001 | Peuse et al. | |
| 6,182,510 B1 | 2/2001 | Stanke et al. | |
| 6,191,399 B1 * | 2/2001 | Van Bilsen | 374/1 |
| 6,283,630 B1 * | 9/2001 | Yazawa | 374/1 |
| 6,481,886 B1 | 11/2002 | Narendrnath et al. | |
| 6,514,376 B1 | 2/2003 | Collins et al. | |
| 6,575,622 B2 * | 6/2003 | Norrbakhsh et al. | 374/141 |
| 6,605,955 B1 | 8/2003 | Costello et al. | |
| 6,635,117 B1 | 10/2003 | Kinnard et al. | |
| 6,647,350 B1 * | 11/2003 | Palfenier et al. | 702/134 |
| 6,709,519 B2 * | 3/2004 | Yaroslavsky | 156/345.27 |
| 6,799,137 B2 * | 9/2004 | Schietinger et al. | 702/134 |
| 6,816,803 B1 * | 11/2004 | Palfenier et al. | 702/134 |
| 6,862,549 B1 * | 3/2005 | Palfenier et al. | 702/134 |
| 2001/0014111 A1 * | 8/2001 | Shimizu | 374/126 |
| 2003/0029835 A1 * | 2/2003 | Yauw et al. | 216/67 |
| 2003/0036877 A1 * | 2/2003 | Schietinger | 702/134 |
| 2004/0208228 A1 * | 10/2004 | Hashikura et al. | 374/179 |
| 2004/0261721 A1 * | 12/2004 | Steger | 118/728 |
| 2005/0037617 A1 * | 2/2005 | Magni | 438/689 |

OTHER PUBLICATIONS

Gabriel et al., "In situ wafer temperature measurement during plasma etching," Solid State Technology Magazine, PennWell Corp., vol. 42, No. 10, Oct. 1999 (6 pages).*

Hirscher, Hans, "Electrostatic Chuck to Boost Your Yield", http://semiconductors.unaxis.com/en/chiponline_72dpi/issue5/c5p39_72.pdf, no date.

"Diffuse-Reflectance Infrared Fourier Transform (DRIFT) Spectroscopy", http://147.46.41.146/C~lii/DRIFT.htm, no date.

"RDS-1000™ vs. Other Techniques", http://www.thermionics.com/drs/drsvspry.htm, no date.

"Chapter 6 Thermal Mass", http://www.seav.vic.gov.au/ftp/buildings/5starhousing/ESHousingManualCh06.pdf, no date.

Ellingboe, Bert, "Plasma Processing in the Microelectronics Industry", http://www.physics.dcu.ie/~jpm/seminars/seminars00_01/intro_to_plasma_processing.PDF, no date.

"In-Situ 4000 White Paper—Solving the problems of pyrometry and thickness measurement during MBE and MOCVD", http://www.svta.com/products/monitoring/IS4K_White%20Paper.pdf, no date.

Thevenard, Laura, "Wafer Temperature Measurement by Infrared Spectroscopy", Ecole Polytechnique Promotion X2000, Rapport De Stage D'Option Scientifique, no date.

Riebau, Rhianna A., <<Photoluminescence Spectroscopy of Strained InGaAs/GaAs Structures>>, Thesis Paper, 2001, no month.

"Module 4: System Overview", Etch Systems—Unity II: Field Engineer Level I, no date.

U.S. Appl. No. 10/608,091, filed Jun. 30, 2003, Steger.

PCT International Search Report mailed May 24, 2005, in PCT/US04/38287.

Written Opinion of the ISA mailed May 24, 2005, in PCT/US04/38287.

* cited by examiner

METHODS AND APPARATUS FOR IN SITU SUBSTRATE TEMPERATURE MONITORING

BACKGROUND OF THE INVENTION

The present invention relates in general to substrate manufacturing technologies and in particular to methods and apparatus for in situ substrate temperature monitoring.

In the processing of a substrate, e.g., a semiconductor substrate or a glass panel such as one used in flat panel display manufacturing, plasma is often employed. As part of the processing of a substrate for example, the substrate is divided into a plurality of dies, or rectangular areas, each of which will become an integrated circuit. The substrate is then processed in a series of steps in which materials are selectively removed (etching) and deposited (deposition) in order to form electrical components thereon.

In an exemplary plasma process, a substrate is coated with a thin film of hardened emulsion (i.e., such as a photoresist mask) prior to etching. Areas of the hardened emulsion are then selectively removed, causing parts of the underlying layer to become exposed. The substrate is then placed in a plasma processing chamber on a substrate support structure comprising a mono-polar or bi-polar electrode, called a chuck or pedestal. Appropriate etchant source are then flowed into the chamber and struck to form a plasma to etch exposed areas of the substrate.

Among the set of process variables that can be adjusted to optimize the plasma process are gas composition, gas phase, gas flow, gas pressure, RF power density, voltage, magnetic field strength, and substrate temperature. Although in theory it may be beneficial to optimize each variable to each processing step, in practice it is often difficult to achieve.

For example, in order to enhance the uniformity of plasma processing of a substrate in a plasma processing apparatus, it is desirable to control the temperature at exposed surfaces of the substrate at which etching occurs, on which material is deposited (e.g., by a CVD or PVD technique), and/or at which photoresist is removed. For example, if a substrate's temperature rises above a certain temperature, substrate damage (e.g., photoresist damage) can occur, and temperature-dependent chemical reactions can be altered. Substrate temperature may also significantly affect plasma selectivity by changing the deposition rate of polymeric films, such as poly-floro-carbon on the substrate surface. Careful monitoring may minimize variation, allow a wider process window for other parameters, and improve process control. However, in practice it may be difficult to directly determine temperature without affecting the plasma process.

In a common temperature measuring technique, a thermocouple is coupled to a substrate. In order to measuring the difference between its own temperature and that of the substrate, a thermocouple must make mechanical contact with the sample. However, in many cases, it is not acceptable or feasible to touch the surface of the substrate during processing. In addition, it is often hard to thermally isolate the thermocouple. That is, the measured temperature may not only comprise radiation generated by the substrate, but may also include thermal energy propagated by other structures in proximity to the thermocouple, such as the chuck.

Another set of techniques involves the use of electromagnetic probes. For example, an electromagnetic pyrometer computes temperature from the intensity of the substrate's emitted radiation (e.g., photoluminescence). In general, a substrate may absorb electromagnetic radiation of some frequency and then emit radiation at another frequency corresponding to the substrates specific structure, composition and quality. However, since other heated structures within the plasma processing system may also produce radiation at the same frequency, isolating the substrate measurement from the background may be problematic. Furthermore, since most optical measurement techniques are sensitive to physical variations between substrates (e.g., doping levels, circuit geometry, backside films, etc.), it is often difficult to determine an absolute temperature. That is, the zero point temperature cannot be readily known. Additionally, for substrate temperatures less than approximately 100° C. (commonly used in plasma processing) the radiated energy may be very small and difficult to detect.

In another electromagnetic technique, an interferometer is used to measure a change in substrate thickness due to absorbed thermal energy. Generally, an interferometer measures a physical displacement by sensing a phase difference of an electromagnetic beam reflected between two surfaces. In a plasma processing system, an electromagnetic beam may be transmitted at a frequency for which the substrate is translucent, and positioned at an angle beneath the substrate. A first portion of the beam may then reflect on the substrate's bottom surface, while the remaining portion of the beam may reflect on the substrate's top surface. However, as before, it is often difficult to determine an absolute temperature since most optical measurement techniques are sensitive to physical variations between substrates. Subsequently, a change to substrate thickness may only generally be correlated only to a corresponding change in temperature.

Still another electromagnetic technique is DRS, or diffuse reflectance spectroscopy. DRS determines the temperature of a semiconductor substrate by spectroscopic analysis of diffusely reflected (or transmitted) incident white light. However, this technique relies on measuring a relatively weak diffusely scattered light signal. Any process that makes the substrate opaque to light renders the DRS signal too low to make accurate temperature measurements (i.e., coating the substrate with a metal, coating the substrate with an absorbing layer, free carrier absorption, etc.). Furthermore, like other electromagnetic techniques, is also suffers from a sensitivity to substrate variations previously described.

Referring now to FIG. 1, a simplified diagram of a plasma processing system 100 is shown. Generally, an appropriate set of gases is flowed into chamber 102 through an inlet 108 from gas distribution system 122. These plasma processing gases may be subsequently ionized to form a plasma 110, in order to process (e.g., etch or deposition) exposed areas of substrate 114, such as a semiconductor substrate or a glass pane, positioned on an electrostatic chuck 116.

Gas distribution system 122 is commonly comprised of compressed gas cylinders 124a–f containing plasma processing gases (e.g., $C_4F_8$, $C_4F_6$, $CHF_3$, $CH_2F_3$, $CF_4$, HBr, $CH_3F$, $C_2F_4$, $N_2$, $O_2$, Ar, Xe, He, $H_2$, $NH_3$, $SF_6$, $BCl_3$, $Cl_2$, $WF_6$ etc.). Gas cylinders 124a–f may be further protected by an enclosure 128 that provides local exhaust ventilation. Mass flow controllers 126a–f are commonly a self-contained devices (consisting of a transducer, control valve, and control and signal-processing electronics) commonly used in the semiconductor industry to measure and regulate the mass flow of gas to the plasma processing system.

Induction coil 131 is separated from the plasma by a dielectric window 104, and generally induces a time-varying electric current in the plasma processing gases to create plasma 110. The window both protects induction coil from plasma 110, and allows the generated RF field to penetrate into the plasma processing chamber. Further coupled to induction coil 131 at leads 130a–b is matching network 132 that may be further coupled to RF generator 138. Matching network 132 attempts to match the impedance of RF generator 138, which typically operates at 13.56 MHz and 50 ohms, to that of the plasma 110.

Generally, some type of cooling system is coupled to the chuck in order to achieve thermal equilibrium once the plasma is ignited. The cooling system itself is usually comprised of a chiller that pumps a coolant through cavities within the chuck, and helium gas fed between the chuck and the substrate. The heat generated in the wafer during plasma processing then flow through the helium, into the chuck, and out to a remotely located heat exchanger unit.

However, although substrate temperature in generally stabilized within a range, its exact value is commonly unknown. Furthermore, since the substrate temperature may not be directly measured, optimizing the recipe may be difficult For example, in creating a set of plasma processing steps for the manufacture of a particular substrate, a corresponding set of process variables, or recipe, may be established. Temperature repeatability between substrates is often important, since many plasma processing recipes may also require temperature variation to be on the order of a few tenths of degree C.

In a typical plasma processing system, a substrate temperature may be determined by calculating plasma power deposited onto the substrate and the heat transfer coefficient derived from the He pressure and the chuck surface conditions. However, since the cooling system may also be operating in an open-loop fashion, subsequent heat flow variations may cause the substrate temperature to vary outside narrow recipe parameters.

Furthermore, the physical structure of the plasma processing chamber, itself, may change. For example, during chamber cleaning, process pollutants may be removed from the plasma processing system by striking the plasma without the substrate. However, during this cleaning process, as the chuck is no longer shielded by the substrate, it is subsequently etched. As the process is repeated, the substrate's surface roughness increases, subsequently modifying its heat transfer efficiency. Eventually, the recipe's parameters are invalidated. Since it is often impractical to determine when this point is exactly reached, the chuck is generally replaced after a certain amount of operational hours, which in practice is normally only a fraction of its useful life. This can both increase productions costs, since an expensive chuck may be needless replaced, and reduces yield, since the plasma processing system must be taken offline for several hours to replace the chuck.

In addition, recipe parameters may also need to be adjusted. For example, a process engineer may wish to increase the level of passivation during plasma processing. Furthermore, an otherwise identical piece of fabrication equipment may be installed at a different time, or is used to a different degree, and its maintenance cycle does not necessarily match that of the others. The recipe parameters may need to be adjusted when moving the process to a newer version of the plasma processing system, or when transferring the process to a plasma processing system that can process a larger substrate size (e.g., 200 mm to 300 mm). Ideally, it would be beneficial to maintain the same recipe parameters (e.g., chemistry, power, and temperature). However, since substrate temperature has been generally inferred and not measured, the process may need to be substantially adjusted through trial and error in order to achieve a similar production profile.

In view of the foregoing, there are desired improved methods and apparatus for in situ substrate temperature monitoring.

SUMMARY OF THE INVENTION

The invention relates, in one embodiment, in a plasma processing system, to a method of determining the temperature of a substrate. The method includes positioning the substrate on a substrate support structure, wherein the substrate support structure includes a chuck. The method further includes creating a temperature calibration curve for the substrate, the temperature calibration curve being created by measuring at least a first substrate temperature with an electromagnetic measuring device, and measuring a first chuck temperature with a physical measuring device during a first isothermal state. The method also includes employing a measurement from the electromagnetic measurement device and the temperature calibration curve to determine a temperature of the substrate during plasma processing.

The invention relates, in one embodiment, in a plasma processing system, to an apparatus for determining the temperature of a substrate. The apparatus includes a means of positioning the substrate on a substrate support structure, wherein the substrate support structure includes a chuck. The method further includes a means of creating a temperature calibration curve for the substrate, the temperature calibration curve being created by measuring at least a first substrate temperature with an electromagnetic measuring device, and measuring a first chuck temperature with a physical measuring device during a first isothermal state. The method also includes a means of employing a measurement from the electromagnetic measurement device and the temperature calibration curve to determine a temperature of the substrate during plasma processing.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
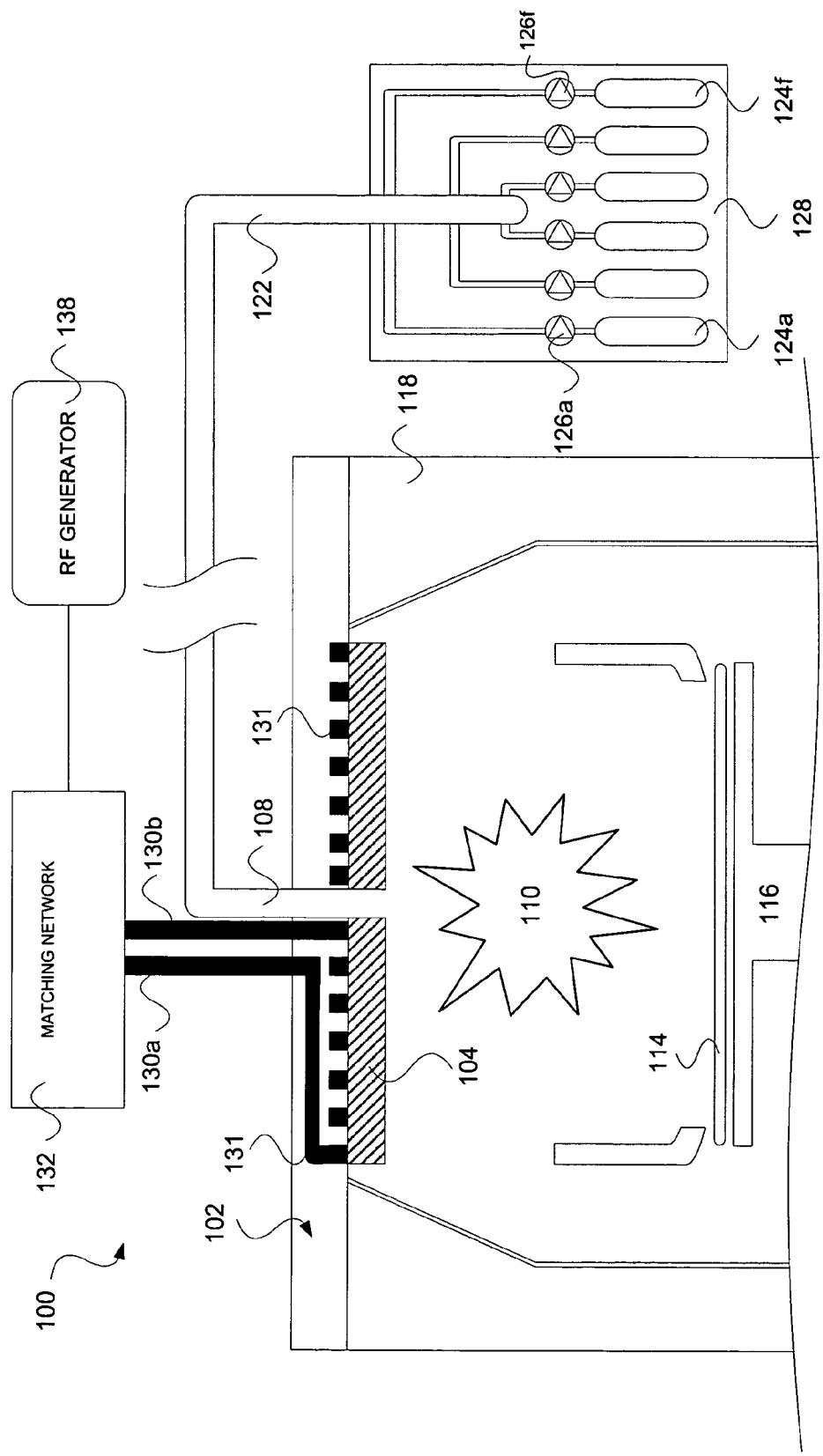
FIG. 1 describes a simplified diagram of a plasma processing system.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one embodiment of the present invention, in a non-obvious fashion, a set of thermocouple measurements and a set of electromagnetic measurements are employed in a plasma processing system to determine a substantially accurate substrate temperature. As previously described, accurately determining the temperature of a substrate in-situ has been difficult, since previous methods are problematic. Thermocouples are difficult to thermally isolate and problematic to couple directly to the substrate. Whereas electromagnetic probes may be overly sensitive to physical variations among substrates. In practice, without an initial set of relatively accurate absolute temperature measurements to calibrate the subsequent measurements, the true temperature of each substrate as it is being processed can only be inferred. Furthermore, the degree of uncertainty created by lack of thermal isolation or the existence of substrate variations may greatly overwhelm the temperature that is being measured.

In another embodiment, the calibration curve is created by taking a single set of electromagnetic and thermocouple measurements in a plasma processing system during an initial isothermal state (i.e., thermal equilibrium). For example, after a substrate is placed in the plasma processing system but prior to actually commencing such processing (i.e., a no-plasma condition), the temperature of the substrate can be made substantially similar to that of the underlying electrostatic chuck once He gas is applied underneath the substrate. At this point, a set of measurements can be made of the chuck with a physical temperature measuring device (e.g., thermocouple, etc.), and of the substrate with an electromagnetic temperature measuring device (e.g., narrow-band pyrometer, monochrometer, grating, band pass optical filter, thermocouple device, etc.). A specific calibration curve can then be determined from the set of measurements.

In another embodiment, the calibration curve is created by taking a plurality of sets of electromagnetic and thermocouple measurements. For example, as described before, after a substrate is placed in the plasma processing system but prior to actually commencing such processing (i.e., a no-plasma condition), the temperature of the substrate can be made substantially similar to that of the underlying electrostatic chuck once He gas is applied underneath the substrate. At this point, a first set of measurements can be made of the chuck with a physical temperature measuring device and of the substrate with an electromagnetic temperature measuring. The temperature of the substrate and the chuck can them be changed by a few degrees, and then a second set of measurements can be made. A specific calibration curve can be determined from the first and second set of measurements, and/or other sets of measurements.

Figure 2:
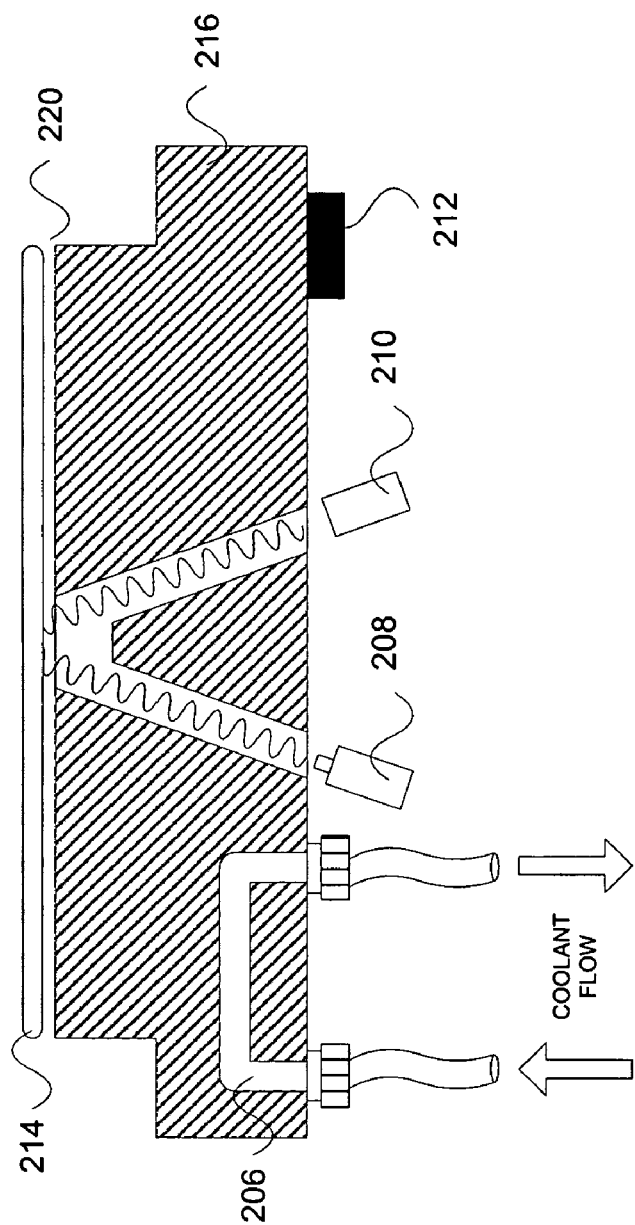
FIG. 2 describes a simplified diagram of a plasma processing system in which electromagnetic and thermocouple measurements are taken from a substrate prior to the introduction of a plasma is shown, according to one embodiment of the invention.

Referring now to FIG. 2, a simplified diagram of a plasma processing system in which electromagnetic and thermocouple measurements are taken from a substrate prior to the introduction of a plasma is shown, according to one embodiment of the invention. Initially, substrate 214 enters the plasma processing chamber, and is placed on chuck 216. As previously described, some type of cooling system is coupled to the chuck in order to achieve thermal equilibrium. The cooling system itself is usually comprised of a chiller that pumps a coolant through cavities 206 within chuck 216, Helium gas 220 is fed between chuck 216 and substrate 214 to provide a heat transfer medium. The plasma processing system further includes an electromagnetic temperature measuring device 210, an electromagnetic radiation transmitter 208, and a physical temperature measuring device 212, such as a thermocouple.

Prior to the introduction of plasma gases, but after the chuck and the substrate are in thermal isolation, a first set of temperature measurements are taken. Initially, the temperature of the chuck is measured with physical temperature measuring device 212, while the temperature of the substrate is also calculated with a digital computer using a mathematical model which uses the electromagnetic radiation detected by electromagnetic temperature measuring device 210. That is, electromagnetic radiation transmitter 208 transmits electromagnetic radiation of known spectral composition (e.g., infrared spectra, etc.) to substrate 214, which in turn, is reflected back to electromagnetic temperature measuring device 210. For some models a single such calibration measurement is sufficient, but in others a second measurement is required. In this case, the temperature of substrate 214 and chuck 216 are subsequently altered, but still maintained in a substantially isothermal state, and a second set of temperature measurements are taken. By performing such calibration measurements for each substrate, variations among substrates can be accounted for and accurate substrate temperatures can be measured during plasma processing.

Figure 3:
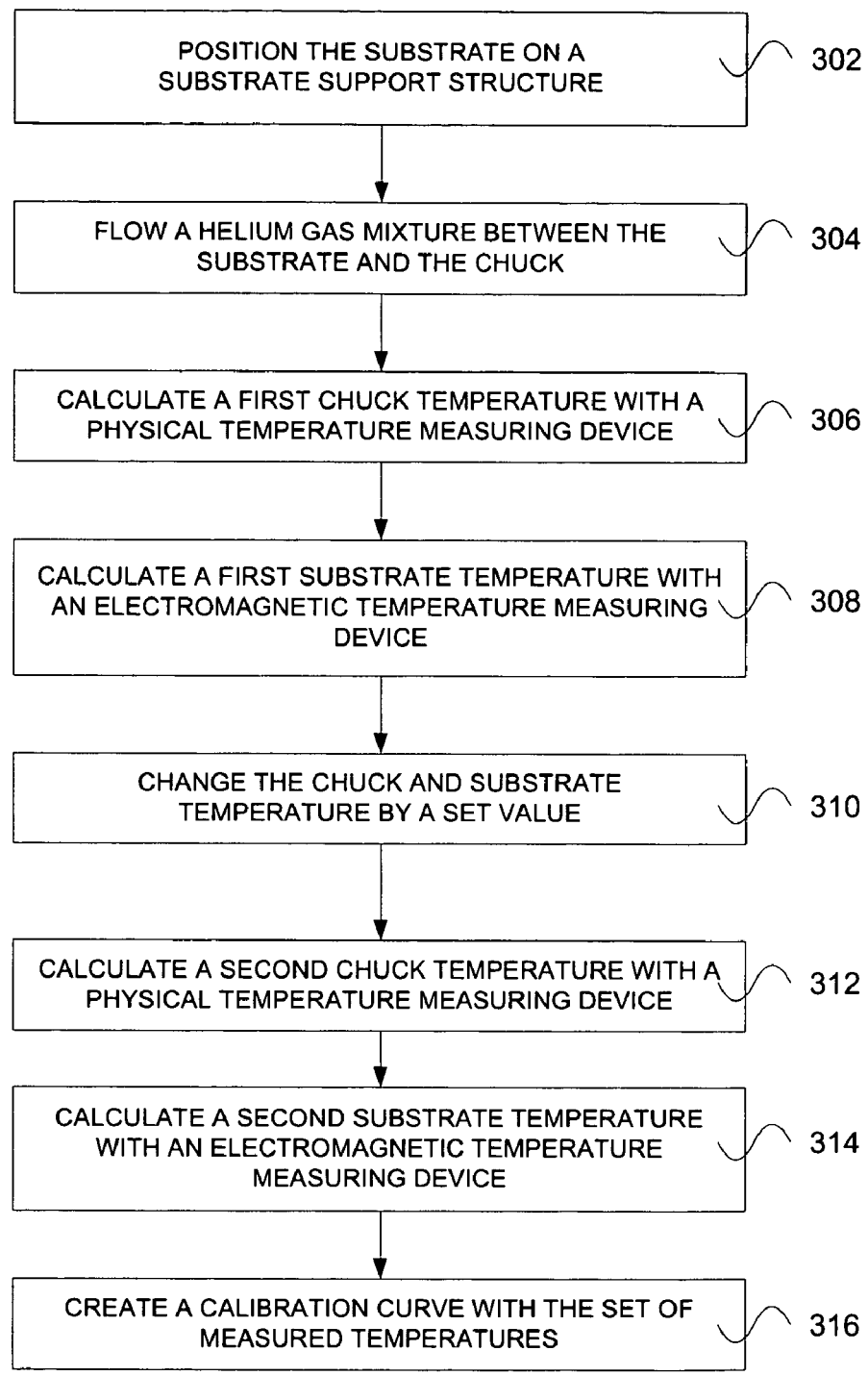
FIG. 3 describes a simplified method in a plasma processing system in which electromagnetic and thermocouple measurements are taken from a substrate prior to the introduction of a plasma is shown, according to one embodiment of the invention.

Referring now to FIG. 3, a simplified method in a plasma processing system in which electromagnetic and thermocouple measurements are taken from a substrate prior to the introduction of a plasma is shown, according to one embodiment of the invention. Initially, the substrate is positioned on a substrate support structure at step 302. A helium gas mixture is then flowed between the substrate and the chuck at step 304. A first chuck temperature is calculated with a physical temperature measuring device (i.e., thermocouple, etc.) at step 306. A first substrate temperature is also calculated with an electromagnetic temperature measuring device at step 308.

The temperature of the substrate and chuck are then changed by a set amount at step 310. A second chuck temperature is calculated with a physical temperature measuring device at step 312. A second substrate temperature is calculated with an electromagnetic temperature measuring device at step 314. And finally, a calibration curve is created with the set of measured temperatures at step 316.

In another embodiment, the electromagnetic radiation absorption of silicon may be used to determine substrate temperature. That is, a measured electromagnetic radiation absorption curve (e.g., IR, etc.) may shift in a known manner with substrate temperature. While not wishing to be bound by theory, generally when electromagnetic radiation (i.e., light) is directed towards a thin slab substrate, it can be partially transmitted and/or reflected. The radiation is subject to absorption while traveling through the substrate. Only the photons whose energy lies above the band gap energy can be absorbed. Those with energies under the band gap energy will go through the substrate unaffected. The transition between the transparent and the opaque regime is called the absorption edge, and is characterized by a strong slope change absorbance, transmittance (light is collected after passing through the substrate) or reflectance spectra (reflected light is collected).

At low temperatures, the dominant absorption mechanism is electronic valence to conduction band transitions. Silicon has an indirect gap, meaning that the minimum of the conduction band is at a different momentum than the maximum of the valence band, so an electron (or a hole) cannot go directly from one band to the other because the conservation of momentum wouldn't be respected. Therefore the transition has to be assisted by interaction with lattice vibrations, and the emission or the absorption of one or several phonons (of non-zero momentum): if momentum is preserved between the incident photon and the phonon, the incident radiation will be completely absorbed by the lattice. At 0° K, the atoms of the lattice do not move at all. When the temperature increases, atoms begin to vibrate around their equilibrium position, thermally exciting the phonons. The behavior of these phonons is partially responsible for the temperature dependence of the absorption edge.

Free carrier absorption also plays a significant role. it is the transition of electrons (in the conduction band) or holes (in the valence band) in the same band. Free carriers are thermally excited, so this type of absorption increases with temperature, and can even turn the substrate completely opaque. These transitions can be aided by impurities, so they are likely to have a stronger influence when the silicon is doped. Generally, since the absorption edge shifts with temperature in a manner which allows for the creation of a mathematical model, it can be used to accurately measure the substrate temperature, once a single temperature is known.

Figure 4:
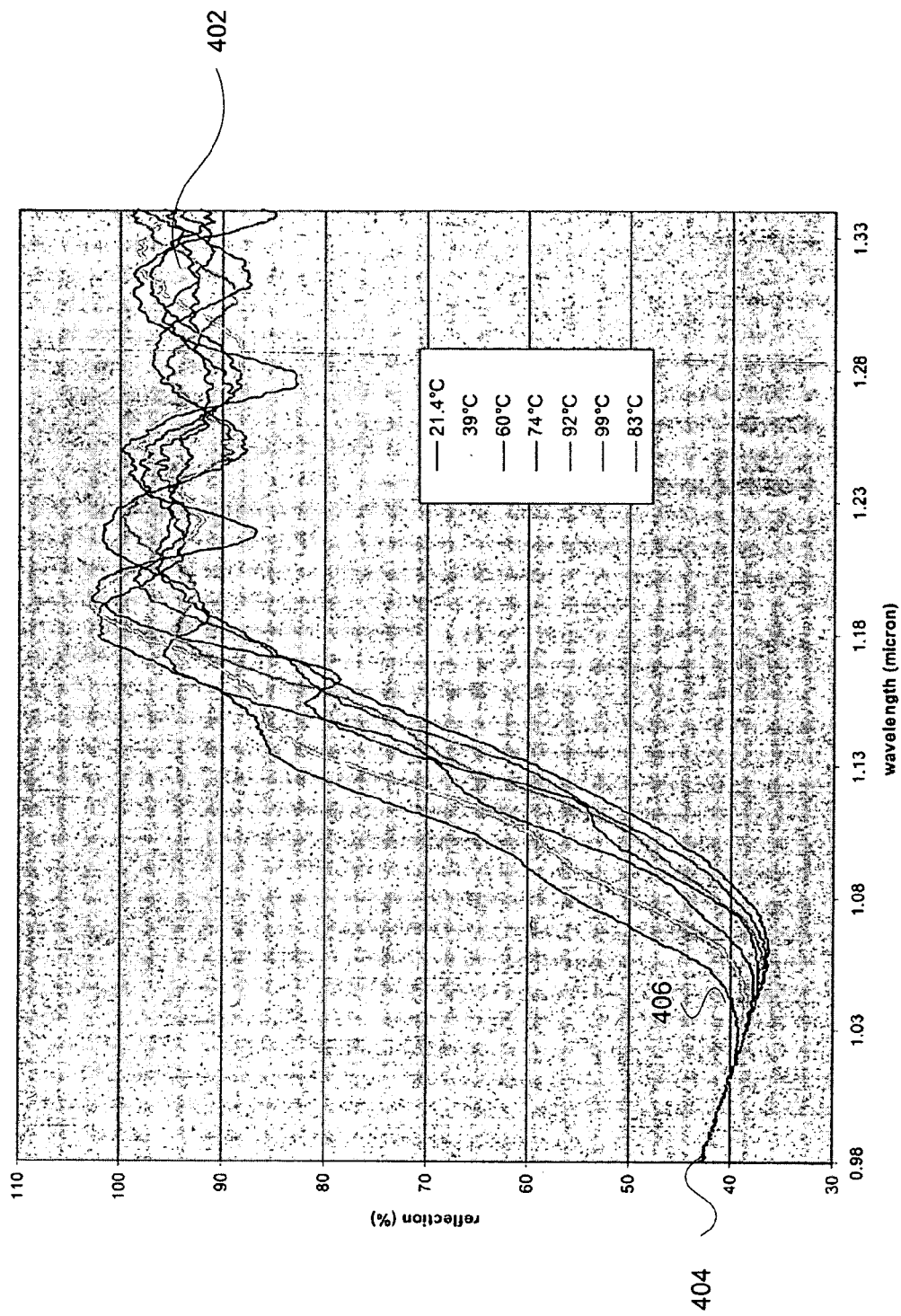
FIG. 4 describes a simplified diagram of electromagnetic absorption at various temperatures for a double polished 300 mm silicon substrate, according to one embodiment of the invention.

For example, referring now to FIG. 4, electromagnetic absorption is shown at various temperatures for a double polished 300 mm silicon substrate, according to one embodiment of the invention. At short wavelengths (high energy) 402, the substrate is opaque and the absorption is high. At long wavelengths 404 (above 1.2 microns, low energy), the substrate is transparent. As electromagnetic radiation enters the substrate and is reflected, and undergoes interferences before exiting the substrate—hence the fringes we see at long wavelength and through the absorption edge. The period of the fringes increases with wavelength as expected: with longer wavelengths, the silicon is more and more transparent, the light has a longer way to travel in the substrate before exiting, so the period of the fringes are larger.

With increasing temperatures, the fringes through the absorption edge seemed damped, and seem to decrease in period. They disappear altogether at 99° C. The absorption edge of the curves shifts towards longer wavelengths as the temperature increases, whereas at low wavelengths (below 1.03 microns), the absorption is very similar at all temperatures, and follows a linear curve. Above 1.18 microns, reflection was over 100% at the lowest temperatures (21.4° C., 39° C., 60° C. and 74° C.) generally because of large amplitude fringes for these temperatures. In particular, at a region of the 1.05 microns 406, the absorption edge may vary with temperature. Hence this "knee wavelength" may be a good region to generate the temperature calibration curve.

In accordance with another embodiment of the present invention, a low-thermal mass chuck is employed. This low thermal mass chuck is part of a low thermal mass heating/cooling system which accepts a temperature set point as well as the result of the substrate temperature measurement using the methods described above. The control system adjusts the chuck temperature to maintain the substrate at the set point value. An additional control method may be applied to use the fact that the heat transfer rate through the He is dependent on the pressure of the He, and this permits the controller to perform fast, fine temperature control.

While this invention has been described in terms of several preferred embodiments, there are alterations, permutations, and equivalents which fall within the scope of this invention. For example, although the present invention has been described in connection with Lam Research plasma processing systems (e.g., Exelan™, Exelan™ HP, Exelan™ HPT, 2300™, Versys™ Star, etc.), other plasma processing systems may be used. This invention may also be used with substrates of various diameters (e.g., 200 mm, 300 mm, etc.). Also, other physical temperature measuring devices and other electromagnetic temperature measuring devices may be used. It should also be noted that there are many alternative ways of implementing the methods of the present invention.

Advantages of the invention include measuring the temperature of a substrate it situ in a plasma processing system. Additional advantages may include the creation of optimal plasma processing recipes, optimizing the replacement of plasma processing structures, such as the chuck, increasing the yield of the plasma processing process itself, facilitating the determination and transfer of a recipe from a first plasma processing system to a second plasma processing system, and extending the chuck's useful life.

Having disclosed exemplary embodiments and the best mode, modifications and variations may be made to the disclosed embodiments while remaining within the subject and spirit of the invention as defined by the following claims.

What is claimed is:

1. In a plasma processing system, a method of determining the temperature of a substrate, comprising:
positioning said substrate on a substrate support structure, wherein said substrate support structure includes a chuck;
introducing a heat transfer gas between said substrate and said chuck;
creating a temperature calibration curve for said substrate, said temperature calibration curve being created by measuring at least a first substrate temperature with an electromagnetic measuring device, and measuring a first chuck temperature with a physical measuring device in thermal contact with said chuck during a first isothermal state of said substrate and said chuck, in the absence of a plasma in said plasma processing system;
employing a measurement from said electromagnetic measurement device and said temperature calibration curve to determine a temperature of said substrate during plasma processing, wherein said plasma is generated in said plasma processing system.

2. The method of claim 1, further including the step of measuring a second substrate temperature with said electromagnetic measuring device, and measuring a second chuck temperature with said physical measuring device during a second isothermal state.

3. The method of claim 1, wherein said substrate is positioned between said plasma and said electromagnetic measuring device.

4. The method of claim 1, wherein said substrate support structure further comprises said physical temperature measuring device.

5. The method of claim 1, where said electromagnetic measuring device comprises a narrow-band pyrometer.

6. The method of claim 1, where said electromagnetic measuring device comprises a monochrometer.

7. The method of claim 1, where said electromagnetic measuring device comprises a grating.

8. The method of claim 1, where said electromagnetic measuring device comprises a band pass optical filter.

9. The method of claim 1, wherein said physical temperature measuring device is a thermocouple device.

10. The method of claim 1, wherein said substrate is a wafer.

11. The method of claim 1, wherein said substrate is a glass panel.

12. The method of claim 1, wherein said measurement comprises a value in an Infrared spectrum.

13. The method of claim 1, wherein said plasma processing system comprises a chemical vapor deposition system.

14. The method of claim 1, wherein said plasma processing system comprises a plasma enhanced chemical vapor deposition system.

15. The method of claim 1, wherein said plasma processing system comprises a physical vapor deposition system.

16. The method of claim 1, wherein said plasma processing gas includes Carbon.

17. The method of claim 1, wherein said plasma processing gas includes Hydrogen.

18. The method of claim 1, wherein said plasma processing gas includes Fluorine.

19. The method of claim 1, wherein said plasma processing gas includes Nitrogen.

20. The method of claim 1, wherein said plasma processing gas includes Oxygen.

21. The method of claim 1, wherein said plasma processing gas includes Argon.

22. The method of claim 1, wherein said plasma processing gas includes Xenon.

23. The method of claim 1, wherein said plasma processing gas includes Helium.

24. The method of claim 1, wherein said plasma processing gas includes Sulfur.

25. In a plasma processing system, an apparatus for determining the temperature of a substrate, comprising:
means of positioning said substrate on a substrate support structure, wherein said substrate support structure includes a chuck;
means of introducing a heat transfer gas between said substrate and said chuck;
means of creating a temperature calibration curve for said substrate, said temperature calibration curve being created by measuring at least a first substrate temperature with an electromagnetic measuring device, and measuring a first chuck temperature with a physical measuring device in thermal contact with said chuck during a first isothermal state of said substrate and said chuck, in the absence of a plasma in said plasma processing system;
means of employing a measurement from said electromagnetic measurement device and said temperature calibration curve to determine a temperature of said substrate during plasma processing, wherein said plasma is generated in said plasma processing system.

26. The apparatus of claim 25, further including a means of measuring a second substrate temperature with said electromagnetic measuring device, and measuring a second chuck temperature with said physical measuring device during a second isothermal state.

27. The apparatus of claim 25, wherein said substrate is positioned between said plasma and said electromagnetic measuring device.

28. The apparatus of claim 25, wherein said substrate support structure further comprises said physical temperature measuring device.

29. The apparatus of claim 25, where said electromagnetic measuring device comprises a narrow-band pyrometer.

30. The apparatus of claim 25, where said electromagnetic measuring device comprises a monochrometer.

31. The apparatus of claim 25, where said electromagnetic measuring device comprises a grating.

32. The apparatus of claim 25, where said electromagnetic measuring device comprises a band pass optical filter.

33. The apparatus of claim 25, wherein said physical temperature measuring device is a thermocouple device.

34. The apparatus of claim 25, wherein said substrate is a wafer.

35. The apparatus of claim 25, wherein said substrate is a glass panel.

36. The apparatus of claim 25, wherein said measurement comprises a value in an Infrared spectrum.

37. The apparatus of claim 25, wherein said plasma processing system comprises a chemical vapor deposition system.

38. The apparatus of claim 25, wherein said plasma processing system comprises a plasma enhanced chemical vapor deposition system.

39. The apparatus of claim 25, wherein said plasma processing system comprises a physical vapor deposition system.

40. The apparatus of claim 25, wherein said plasma processing gas includes Carbon.

41. The apparatus of claim 25, wherein said plasma processing gas includes Hydrogen.

42. The apparatus of claim 25, wherein said plasma processing gas includes Fluorine.

43. The apparatus of claim 25, wherein said plasma processing gas includes Nitrogen.

44. The apparatus of claim 25, wherein said plasma processing gas includes Oxygen.

45. The apparatus of claim 25, wherein said plasma processing gas includes Argon.

46. The apparatus of claim 25, wherein said plasma processing gas includes Xenon.

47. The apparatus of claim 25, wherein said plasma processing gas includes Helium.

48. The apparatus of claim 25, wherein said plasma processing gas includes Sulfur.

49. In a plasma processing system, a method of determining the temperature of a substrate during plasma processing, comprising:
creating a mathematical model relating temperature changes of said substrate to optical properties changes of said substrate, including
a) positioning said substrate on a substrate support structure of said plasma processing system, wherein said substrate support structure includes a chuck,
b) introducing a heat transfer gas between said substrate and said chuck,
c) allowing said substrate and said chuck to come to thermal equilibration, at which time said chuck temperature is measured using a contact measurement technique,
d) directing electromagnetic radiation of known spectral composition onto a surface of said substrate, e) obtaining first electromagnetic energy measurement, said first electromagnetic energy measurement measuring first electromagnetic energy reflected from said surface of said substrate responsive to said directing, f) employing said chuck temperature measured using said contact measurement technique and said first electromagnetic energy measurement to create said mathematical model; and calculating said temperature of said substrate during said plasma processing, including obtaining second electromagnetic energy measurement, said second electromagnetic energy measurement measuring second electromagnetic energy reflected from said surface of said substrate during said plasma processing, and employing, using a digital computer, said chuck temperature measured using said contact measurement technique, said first electromagnetic energy measurement, said second electromagnetic energy measurement, and said mathematical model to perform said calculating said temperature of said substrate during said plasma processing.

* * * * *